US009679433B2

(12) United States Patent
Hall

(10) Patent No.: US 9,679,433 B2
(45) Date of Patent: Jun. 13, 2017

(54) METHOD OF GAMING, A GAMING SYSTEM AND A GAME CONTROLLER

(75) Inventor: Naomi Hall, Kareela (AU)

(73) Assignee: ARISTOCRAT TECHNOLOGIES AUSTRALIA, PTY. LIMITED (AU)

( * ) Notice: Subject to any disclaimer, the term of this patent is extended or adjusted under 35 U.S.C. 154(b) by 1406 days.

(21) Appl. No.: 12/194,916

(22) Filed: Aug. 20, 2008
(Under 37 CFR 1.47)

(65) Prior Publication Data

US 2009/0209315 A1 Aug. 20, 2009

(30) Foreign Application Priority Data

Aug. 20, 2007 (AU) ................................ 2007904488

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/32* (2013.01); *G07F 17/3244* (2013.01); *G07F 17/3258* (2013.01)

(58) Field of Classification Search
CPC ... G07F 17/32; G07F 17/3244; G07F 17/3258
USPC ............................ 463/16, 20, 25, 26, 27, 42
See application file for complete search history.

(56) References Cited

U.S. PATENT DOCUMENTS

| | | | | |
|---|---|---|---|---|
| 5,046,736 | A | 9/1991 | Bridgeman | |
| 5,645,486 | A * | 7/1997 | Nagao | G07F 17/32 463/27 |
| 5,911,626 | A | 6/1999 | McCrea, Jr. | |
| 6,117,012 | A | 9/2000 | McCrea, Jr. | |
| 6,346,044 | B1 | 2/2002 | McCrea, Jr. | |
| 6,406,020 | B1 | 6/2002 | Reed | |
| 6,461,240 | B1 | 10/2002 | Perkins | |
| 6,755,421 | B1 | 6/2004 | Aftergood | |
| 6,869,361 | B2 * | 3/2005 | Sharpless et al. | 463/25 |
| 2002/0151357 | A1 * | 10/2002 | Acres | 463/25 |
| 2002/0190469 | A1 | 12/2002 | Conklin | |
| 2003/0045343 | A1 * | 3/2003 | Luccesi et al. | 463/20 |
| 2003/0181231 | A1 * | 9/2003 | Vancura et al. | 463/9 |
| 2004/0082373 | A1 | 4/2004 | Cole et al. | |
| 2004/0087370 | A1 * | 5/2004 | Tarantino | 463/42 |
| 2004/0130094 | A1 | 7/2004 | Hunter | |

(Continued)

FOREIGN PATENT DOCUMENTS

| | | |
|---|---|---|
| CA | 2202826 | 10/1997 |
| CA | 2504494 | 10/2006 |

(Continued)

*Primary Examiner* — Omkar Deodhar
*Assistant Examiner* — Wei Lee
(74) *Attorney, Agent, or Firm* — McAndrews, Held & Malloy, Ltd.

(57) ABSTRACT

There is disclosed a gaming system and method of gaming for playing a game, wherein in response to receipt of an additional bet from a player, the player is able to obtain at least one additional outcome in relation to which an additional prize is awarded. It is determined independently of whether the player has placed the additional bet, whether to award the additional prize to the player based on an amount bet by the player.

42 Claims, 8 Drawing Sheets

(56) References Cited

U.S. PATENT DOCUMENTS

| | | | | |
|---|---|---|---|---|
| 2004/0219969 | A1* | 11/2004 | Casey | G07F 17/3232 463/20 |
| 2005/0020338 | A1 | 1/2005 | Stein | |
| 2005/0051962 | A1 | 3/2005 | Chapman | |
| 2005/0051963 | A1 | 3/2005 | Snow | |
| 2005/0119047 | A1* | 6/2005 | Olive | 463/27 |
| 2005/0148383 | A1* | 7/2005 | Mayeroff | 463/20 |
| 2005/0239542 | A1* | 10/2005 | Olsen | 463/27 |
| 2006/0089191 | A1* | 4/2006 | Singer et al. | 463/20 |

FOREIGN PATENT DOCUMENTS

| | | |
|---|---|---|
| WO | 9829169 | 7/1998 |
| WO | 0200314 | 1/2002 |
| WO | 2004033055 | 4/2004 |

* cited by examiner

METHOD OF GAMING, A GAMING SYSTEM AND A GAME CONTROLLER

RELATED APPLICATIONS

The present application is a non-provisional application, which claims priority to Australian Provisional Patent Application No. 2007904488 filed Aug. 20, 2007, which is incorporated herein by reference in its entirety.

BACKGROUND OF THE INVENTION

Field

The present invention relates to a method of gaming, a gaming system and a game controller.

Background to the Invention

In some markets gaming is regulated and gaming machines must comply with the rules set by the regulatory authority. Some rules specify a proportion of bet value which must be returned by the house to the game players as prizes.

It is known to implement special features where a player is eligible for additional prizes by paying an additional bet, known as an ante-bet. However, regulations in some gaming markets do not allow a separate prize pool which is only eligible using an ante-bet.

BRIEF SUMMARY OF THE INVENTION

In the first aspect, there is disclosed a gaming method comprising:

- providing a game having prizes for awarding to players of the game based on base outcomes of the game;
- enabling, in response to receipt of an additional bet from the player, the player to obtain at least one additional outcome in relation to which an additional prize is awarded; and
- determining independently of whether the player has placed the additional bet, whether to award the additional prize to the player based on an amount bet by the player.

In an embodiment, it is determined whether an amount bet by a player meets a trigger condition for the additional prize.

In an embodiment, the amount bet is proportional to a chance of the player being randomly awarded the additional prize.

In an embodiment the trigger condition is based on a proscribed return to player (RTP) for the one or more prizes from the second set of prizes.

In an embodiment each of the one or more additional outcomes is an outcome of a feature game for which an additional prize can be awarded.

In an embodiment the trigger condition is determined based on the probability of the prize being awarded for a feature game and a cumulative bet amount. For example, a trigger condition of an embodiment is a cumulative bet amount reaching a threshold value. In this example the threshold value can be determined using the equation:

$$T = \frac{V}{RTP} \quad [1]$$

where T is the threshold value, V is the prize value and RTP is the return to player for the prize and RTP is based on the probability of the prize being awarded for a feature game.

In an embodiment where the amount bet is proportional to a chance of the player being randomly awarded the additional prize, for each game, a set of random numbers is selected for a player, and the size of the set is based on the amount bet by the player. A random trigger number is selected for the game and if this trigger number matches a number in the player's set of numbers the additional prize is awarded to the player. In this embodiment the trigger number is selected based on the proscribed RTP for a mystery prize automatically and independently of the player number set selection.

In an embodiment at least one additional prize is a progressive prize.

In an embodiment an additional prize is a fixed prize. Examples of fixed prizes are predetermined credit amounts, predetermined cash amounts, goods such as cars or televisions, or services such as accommodation, tours or spa treatments.

In a second aspect there is disclosed a game controller arranged to control play of a game and, in response to the additional bet being placed by the player, enable the player to obtain at least one additional outcome in relation to which an additional prize is awarded, and the game controller including a prize manager arranged to:

- award prizes for the game based on outcomes of the game; and
- determine independently of whether the player has placed an additional bet, whether to award the additional prize to the player based on the amount bet by the player.

In a third aspect, there is disclosed a gaming system comprising:

- a player interface arranged to enable a player to enter instructions to play a game, the instructions including bet instructions for a base bet and an optional additional bet;
- a game controller arranged to control play of a game and, in response to the additional bet being placed by the player, enable the player to obtain at least one additional outcome in relation to which an additional prize is awarded; and
- a prize manager arranged to:
  - award prizes for the game based on outcomes of the game; and
  - determine independently of whether the player has placed an additional bet, whether to award the additional prize to the player based on the amount bet by the player.

The gaming system may be implemented as a stand alone gaming machine or across a network.

In a fourth aspect computer program code is provided which when executed causes a computer to implement a computer implemented method of gaming as described above.

In a fifth aspect there is provided a computer readable medium comprising the above program code.

In a sixth aspect there is provided a data signal comprising the above program code.

A seventh aspect provides transmitting the above program code via a communication network.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
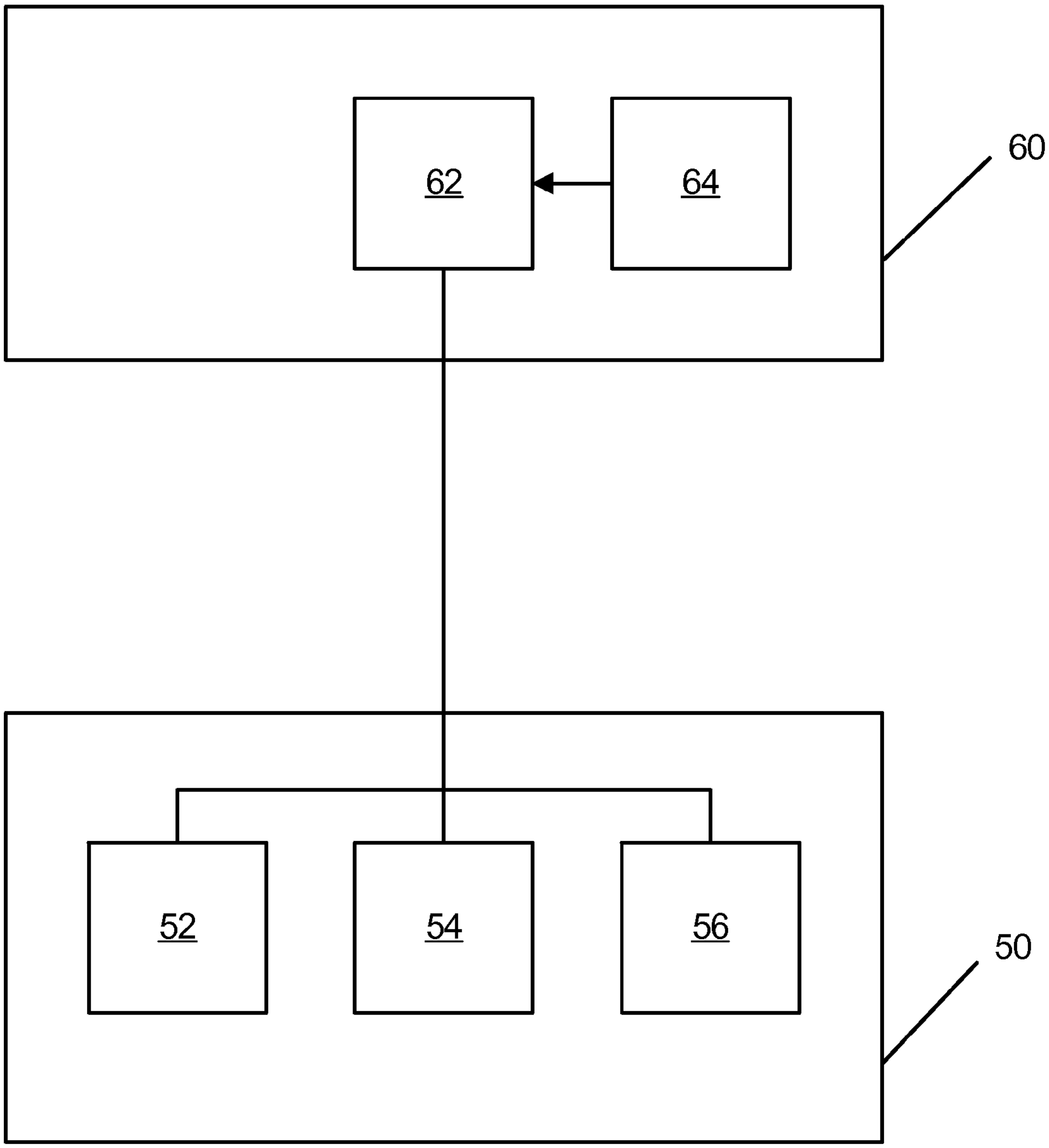
FIG. 1 is a block diagram of the core components of a gaming system.

Referring to the drawings, there is shown a gaming system arranged to implement a game which provides a game, having a first set of prizes which can be awarded to players based on a game outcome for a base game. A player paying an additional bet, known as an ante bet, enables the player to obtain at least one additional outcome in relation to which an additional prize is awarded. The gaming system enables the additional prize to be awarded to a player, independently of whether the player has made an additional bet, based on the amount bet by the player. The gaming system can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
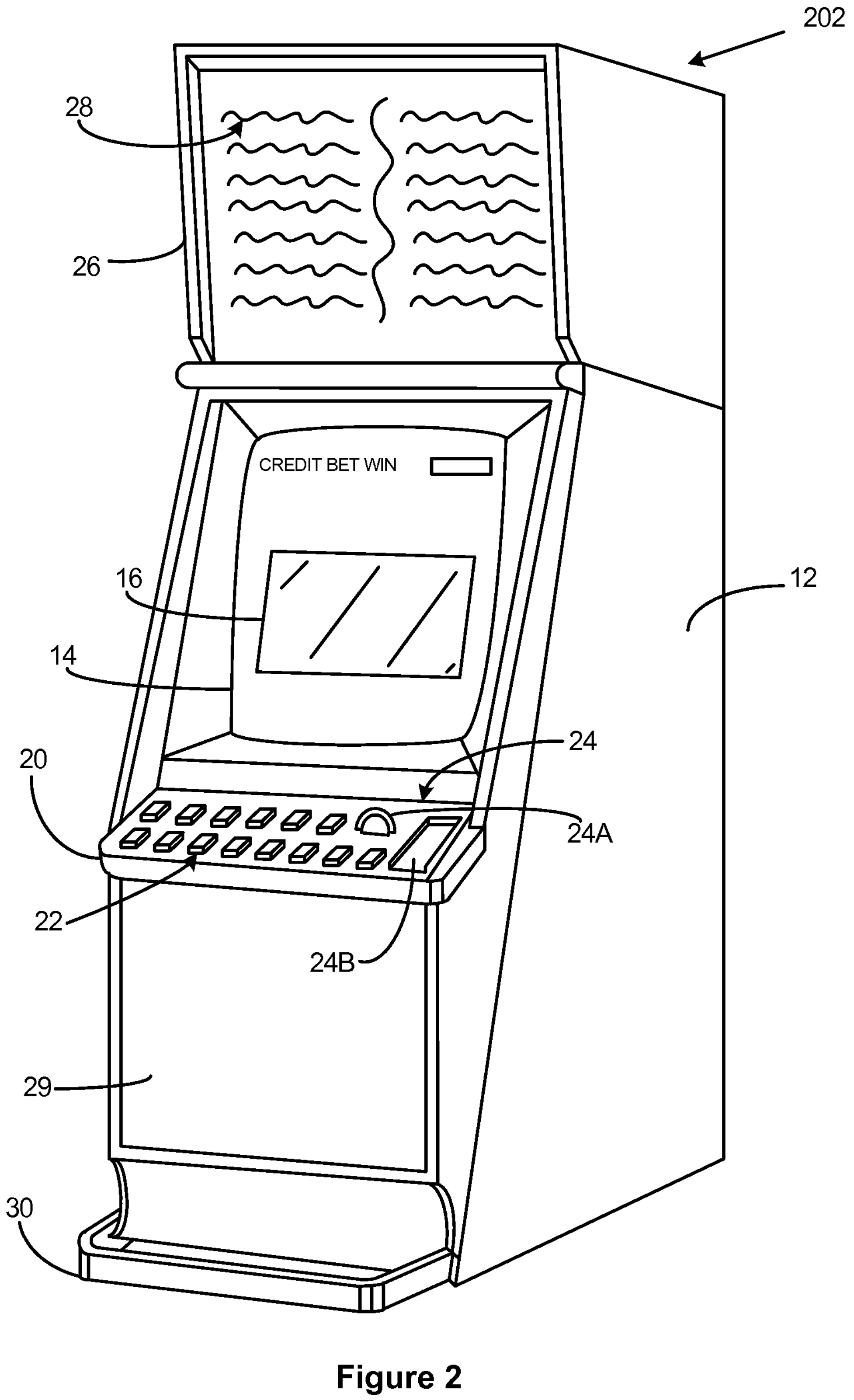
FIG. 2 is a perspective view of a gaming machine.

A gaming system in the form of a stand alone gaming machine 202 is illustrated in FIG. 2. The gaming machine 202 includes a console 12 having a display 14 on which is displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
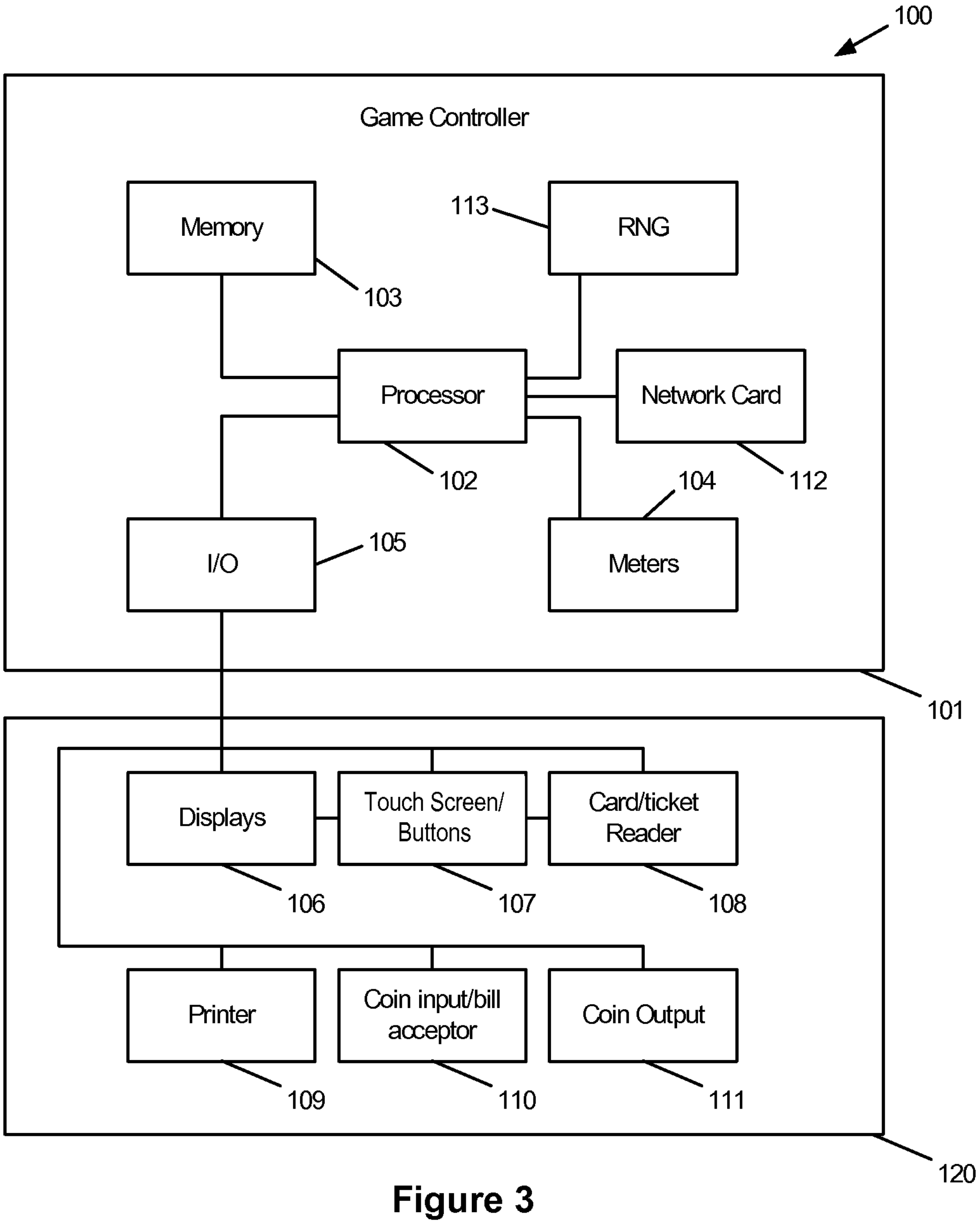
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
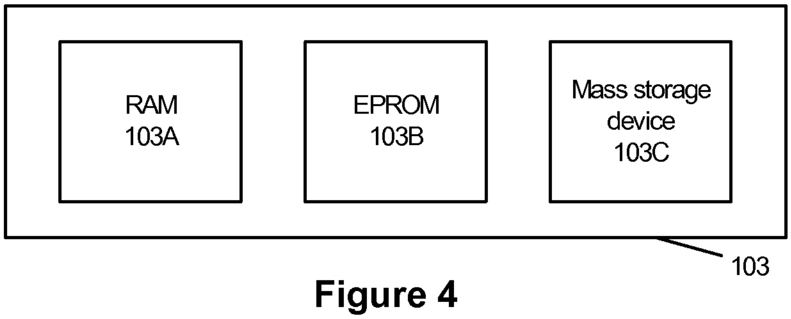
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
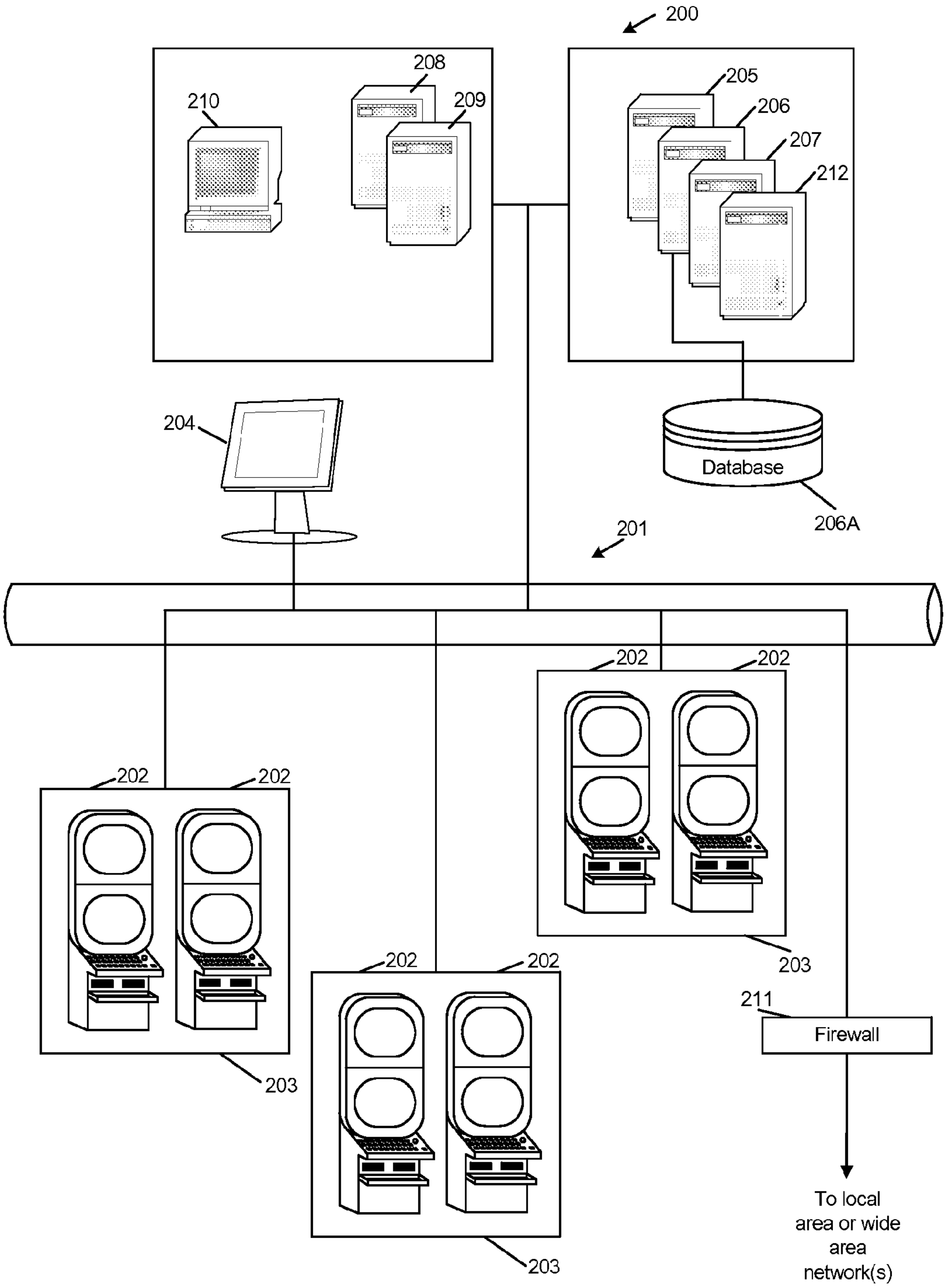
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 202,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out account for the Jackpot game. In some embodiments the Jackpot server may also determine when to randomly award additional prizes, also known as mystery prizes or mystery jackpots. A loyalty server 212 may also be provided to carry out a loyalty program.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Embodiments described herein relate to gaming systems that allow a player to select whether to play a base game for with they pay a regular bet only or pay an additional bet, known as an ante bet, which enables at least one additional game outcome to occur in relation to which an additional prize can be awarded. A regular bet buys a game having a base set of prizes available to win. An ante bet is additional to a regular bet, so a person paying an ante bet has available the base prizes of the game and additional prizes available through the additional game outcomes. An ante bet is also dedicated to the addition of the additional outcome. This is in contrast to an additional outcome being added when a player makes a maximum bet on the available win lines where a bet specific to the added outcome cannot be identified by the player. That is, in this embodiment, the game outcomes from which the additional prize can be won, are not available otherwise, so paying the ante bet does not merely alter the chance of an outcome occurring.

In some embodiments the additional game outcomes are enabled through a number of different mechanisms, including but not limited to the addition of extra symbols to a selected outcome symbol set, providing wild cards, and additional game functions such as additional spins or draws.

In some embodiments additional game outcomes are outcomes which can occur in a feature game and payment of the ante bet enables access to the feature game for the player. Paying the ante bet may guarantee the player one or more feature game outcomes during game play or give the player the chance to receive one or more feature game outcomes, for example where the feature game is triggered by a base game outcome. There are many forms of feature games and all possible variations may be applied for embodiments of the system. For example, a feature game may be implemented as a number of free spins or re-spins generating additional outcomes. Feature games may be triggered during play of the base game. Feature game outcomes may be of the same type as the base game, such as a number of free spins for a spinning reel game. Alternatively a completely different gaming method may be applied for feature play, for example a spinning reel base game and dice roll or mystery prize selection for feature game outcomes.

In another example a feature game may be a modification of a base game, such as adding additional symbols to one or more spinning reels or enabling a player to "nudge" or move one or more reels to modify a base game outcome to generate a feature game outcome.

Persons skilled in the art will appreciate that a player's win entitlement will vary from game to game. For example, in spinning reel games, it is typical for a player's win entitlement to be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In some games, the player's win entitlement is not strictly limited to the lines they have selected, for example, "scatter" pays are awarded independently of a players selection of pay lines, such pays may be inherent in the game and the players' win entitlement, or a chance for a scatter pay may be enabled in response to payment of an additional bet.

In previously known gaming systems employing an ante bet a player is only entitled to win the additional outcomes if the player pays an ante bet. In response to paying the ante bet additional game outcomes are enabled for the player for which an additional prize will be awarded if one of these additional outcomes occurs for the player during game play. Thus, paying the ante bet gives the player a chance to win one or more additional prizes not otherwise available for winning through playing the base game. A player who doesn't pay an ante bet does not have the additional outcomes enabled and thus can only win prizes from a prize set available for the base game.

Embodiments of the system described herein are adapted such that all players of the game are entitled to win both prizes for the base game and additional prizes irrespective of whether or not the player has paid an ante bet. An embodiment of the gaming system awards an additional prize as mystery prize to players of the game independent of whether the player has paid an ante bet. This enables players to win one or more additional prizes without paying the additional bet required to enable additional outcomes for the game. The determination of whether or not to award the additional prize is based on the amount bet by the player.

Embodiments can be applied for any type of regular or feature game, for example, spinning reel games, poker, bingo, Keno, dice games etc.

In an embodiment a trigger condition is used to determine whether to award the additional prize to a player. For example the trigger condition can be based on a proscribed return to player (RTP) for the additional prize.

In another embodiment the amount bet by the player is proportional to the chance of the player being randomly awarded the prize.

It should be appreciated that for a player who pays an ante bet additional game outcomes are enabled for which the player is entitled to win additional prizes. The player paying the ante bet may therefore win an additional prize outright based on a game outcome. All players, irrespective of whether they pay an ante be or not, are entitled to be awarded an additional prize randomly, for example as a mystery prize. Thus, a player who pays the ante bet has a higher probability of winning an additional prize than a player who only pays a base bet, but both players are still entitled to win additional prizes.

Figure 6:
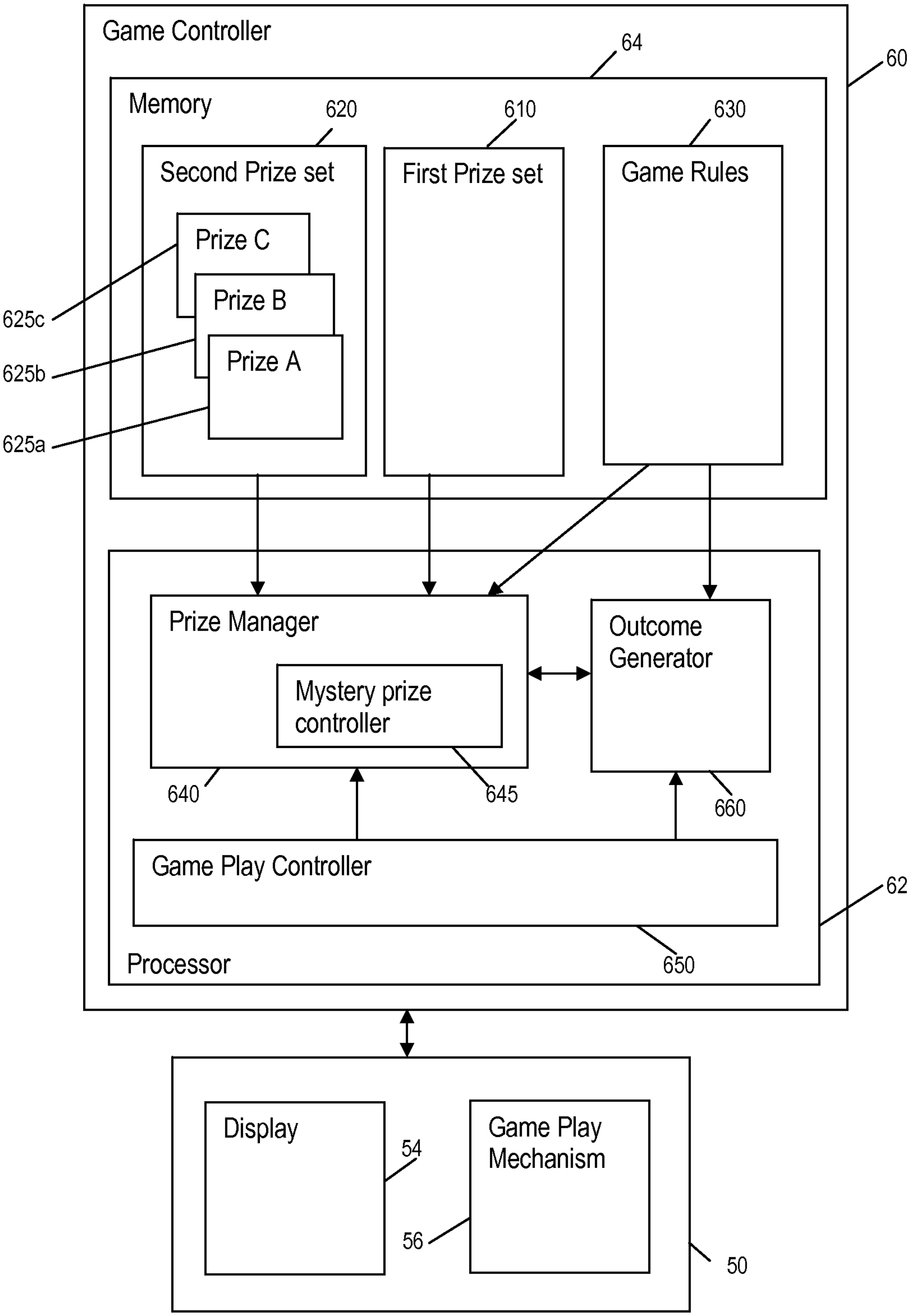
FIG. 6 is a further block diagram of a gaming system.

A gaming system is illustrated in FIG. 6. (Where possible the same numbering as FIG. 1 is used.) The gaming system of this embodiment includes a gaming controller 60 and a player interface 50. The gaming controller 60 includes a processor 62 and memory 64. Functions implemented in the game controller include a prize manager 640, a game play controller 650, and an outcome generator 660. The player interface includes a display 54 and game play mechanism 56.

The game play controller 650 determines from information received from the game play mechanism whether the player has paid an additional bet or only placed a regular bet to play the game. The game play controller 650 also controls the play of the game.

In some embodiments an additional bet is paid to enable a feature game where additional game outcomes can occur for which additional prizes are awarded. In such embodiments the game play controller 650 triggers an outcome for the feature game in accordance with game rules and a predetermined probability for the feature game. Eligibility criteria may be defined for triggering a feature game. For example, an outcome of a base game, such as a display of a special feature symbol, may be used to trigger an additional outcome where the player has paid the additional bet, such as a further spin of a reel, for which an additional prize may be awarded.

Alternatively the game play controller may determine when an additional game outcome is to occur directly based on a given probability for the additional game outcome where the player has paid an ante bet.

Game play functions executed in embodiments the game play controller 650 will be dependent on the type of game the system embodies. For example, for a spinning reel game the game play functions can include reel spin controllers and stop position calculators or symbol selectors whereas a card game may include shuffle and deal controllers. Typically the game play controller will use the output of a random number generator as an input to the game play functions for generating a game result which is represented to the player, for example as symbols on a graphical display 54. A person skilled in the art will readily understand that embodiments of the present invention can be applied to any game type.

The game outcome generator 660 determines whether a winning game outcome occurs (e.g. an outcome for which a prize can be awarded) based on the game rules 630 and the result generated by the game play controller 650.

The prize manager 640 awards prizes to players of the game from a prize set 610 based on game outcomes and awards additional prizes 620 based on additional outcomes enabled in response to the player paying an additional bet.

The prize manager 640 is further adapted to award at least one additional prize independent of whether the player has paid an additional bet based on the amount bet by the player. Thus, an additional prize 620 can be awarded randomly to a player of a game, without requiring the player to pay the additional bet.

In some embodiments the prize manager includes a mystery prize controller 645 which determines when to award an additional prize to a player independent of whether the player has paid an additional bet.

Embodiments provide additional prizes, typically awarded for outcomes enabled by payment of an ante bet, as mystery prizes for players of the game so that players can be eligible to win the additional prizes without paying an ante bet.

In an embodiment a trigger condition for awarding a mystery prize is based on a proscribed return to player for the additional prize available through the additional outcomes. For example, a trigger condition can be a total bet trigger amount calculated based on the value of the prize and the proscribed return to player. When the total bets for the game reach the trigger amount, the mystery prize is awarded to whichever game player caused the trigger condition to be met when they place their bet. Thus the mystery prize is awarded randomly to a player of the game based on the amount they bet.

In another embodiment the mystery prize controller 645 determines the trigger condition for each prize 625*a*, 625*b* and 625*c* which may be allocated as a mystery prize. The mystery prize controller 645 also monitors the trigger conditions to determine when they are met and appropriately awards a mystery prize. For example, where the trigger is a cumulative bet total to randomly award prize A 625*a* as a mystery prize, the mystery prize controller 645 determines the trigger threshold value for the prize A 625 based on the prize value and return to player for the prize and subsequently monitors the cumulative regular bet total. When a player places a bet which causes the cumulative bet total to reach or exceed the threshold, the prize 625*a* is awarded to that player. The mystery prize controller 645 then resets the trigger monitoring and begins monitoring again for a trigger condition to be met.

The mystery prize controller 645 can also monitor to determine when an additional prize, such as a progressive prize 625*b*, is awarded as a result of an additional game outcome where an ante bet was placed and thus becomes unavailable for awarding as a mystery prize. For example, if a trigger condition for prize B 625*b* is being monitored for awarding prize B 625*b* as a mystery prize, and a player is awarded prize B 625*b* in response to an outcome from a feature game, the mystery prize controller 645 will ceases to monitor a trigger condition for prize B 625*b* as this prize has become unavailable. The mystery prize controller 645 selects another prize, prize C 625*c*, from the available additional prizes and updates the monitored trigger condition for prize C 625*c*. If there are no further additional prizes available, for example where there was only one car available as an additional prize and this car has been awarded, the mystery prize controller may cease to monitor the trigger condition.

The prize selection by the mystery prize controller 645 may be based on game rules, for example the next most valuable additional prize may be selected as a mystery prize and the trigger condition recalculated accordingly. Alternatively a new mystery prize may be randomly selected, the trigger condition recalculated, and the trigger monitoring reset.

Alternatively trigger conditions for more than one prize may be monitored simultaneously by the mystery prize controller. In this case the mystery prize controller simply ceases to monitor the trigger condition for any prize awarded based on the game outcome.

In an alternative embodiment the amount a player bets is proportional to a chance of winning a mystery prize. In this embodiment one chance of winning a mystery prize is allocated a credit value, and the player is provided with a number of chances based on the amount bet. For example, a chance to win a mystery prize may be allocated a credit value of ten credits, if a player bets one hundred credits, then the player is provided with ten chances to win the mystery prize. If the player bets five hundred credits, then the player is provided with fifty chances to win the mystery prize.

For example, if a spinning reel game has a base bet of twenty credits per win line and a player selects five win lines, then their bet to play the base game is one hundred credits, and they will also be provided with ten chances to win the mystery prize. The player also has an option of placing an ante bet for a chance to play feature game in which additional prizes may be awarded, including the prize selected as the mystery prize. However, if the player does not pay the ante bet, the player still has the ability to win the mystery prize through the ten chances provided based on their bet for the base game. Another player may place a bet of twenty credits for each of five win lines for the base game and also pay an ante bet of four hundred credits for a chance of feature game play having additional game outcomes for which additional prizes may be awarded. This player has placed a total bet of five hundred credits so the player will also be provided with fifty chances to win the mystery prize.

The chances to win the mystery prize in some embodiments are in the form of a set of randomly selected numbers, wherein each number represents one chance, thus the size of the set is based on the amount bet by the player. Once the set of number is selected for the player and independent of the selection of the player set of numbers, a trigger number is randomly selected for the game. If the trigger number matches a number in the player set, then the player is awarded the mystery prize. The selection of the player numbers and the trigger numbers can be based on a proscribed return to player for the mystery prize in accordance with game rules.

In an exemplary embodiment at least one of the additional prizes 625*a*, 625*b* or 625*c* is a progressive prize. A set of additional prizes 620 can include progressive fixed prizes such as televisions, cars, hotel stays etc, as well as prizes such as jackpots of money or game credit points which can be multiplied for divided between players. In some embodiments the additional prizes may include only fixed prizes. Alternatively the additional prizes may include no fixed prizes. In some embodiments there is only one additional prize available.

Gaming regulations generally proscribe the percentage value of total bets which must be returned to player for game outcomes where a regular bet is paid and outcomes where an ante bet is paid. In some jurisdictions the return to player for an ante-bet may be different from that of a regular bet.

For example, a return to player of 90% is proscribed for a regular bet and an ante-bet. Where a player bets X to play a game then prizes for the game outcomes are designed to return to player 90% of X. Where the player pays an ante bet, the player pays an additional bet of Y, and the prizes for the additional game outcomes enabled by the feature are designed to return to player 90% of Y. Thus for a bet of X+Y the return to player will be 90% of X and 90% of Y.

For another example, a return to player of 90% is proscribed for a regular bet and a return to player of 95% for an ante-bet. Where a player bets X to play a game then prizes for the game outcomes are designed to return to player 90% of X. Where the player pays an additional ante bet of Y, additional outcomes are enabled and the prizes for the additional outcomes are designed to return to player 95% of Y. Thus for a bet of X+Y the return to player will be 90% of X and 95% of Y.

Where a trigger condition is used for awarding a mystery prize, the trigger condition can be based on the proscribed return to player for the additional game outcomes enabled by paying an ante bet. In an embodiment the trigger condition is a threshold value of a cumulative total bets for the game. In this embodiment the threshold value is determined using equation 1 below:

$$T = \frac{V}{RTP} \quad [1]$$

Where T is the threshold value, V is the prize value and RTP is the return to player for the prize which in turn is based on the probability of the prize being awarded for an additional game outcome enabled in response to paying the ante bet. Determining the threshold in this manner is advantageous in the case of fixed, non-cash style prizes, which cannot be multiplied or divided.

For cash or game credit style prizes, a prize amount may be calculated for a game outcome based on game rules, so a credit pool may be divided between a plurality of players or the amount awarded to each player may vary for each prize awarded based on the game rules. Whereas, with fixed prizes the prize value is predetermined and an entire fixed prize must be awarded to one player. Thus, calculating a trigger condition based on the prize value and proscribed return to player is particularly suitable for fixed prizes.

Figure 7:
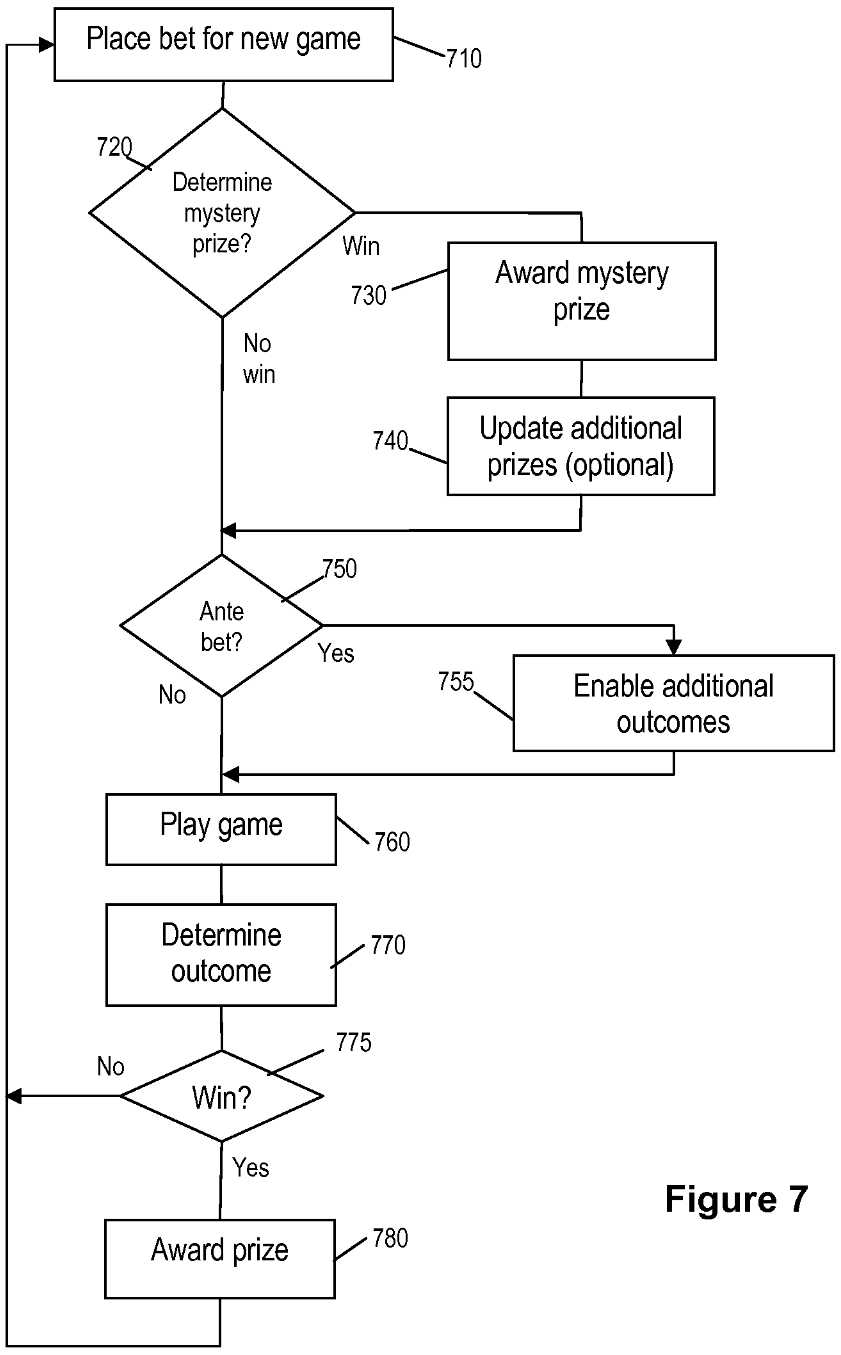
FIG. 7 is a flowchart of an example of awarding mystery prizes for a game.

An example of the game play and prize awarding process is illustrated in FIG. 7. A player places a bet for a new game 710. It is then determined whether a mystery prize is won based on the bet amount 720. If a win is determined then a mystery prize is awarded to the player 730, and, if necessary, the additional prizes updated 740 to reflect the awarding of the mystery prize, for example where the mystery prize is a fixed prize, such as a television, this fixed prize is removed from a list of available fixed prizes in a list of additional prizes.

If the player has paid an ante bet 750, then additional outcomes are enabled for the player 755. The game is then played 760 and one or more outcomes determined 770, where the outcome is a win 775, a prize is awarded 780 to the player, otherwise the game ends and the player places another bet to play a new game 710.

Although the flowchart of FIG. 7 shows a scenario where it is determined whether to award a mystery prize before playing the game, it should be appreciated by those skilled in the art that the determination of the mystery prize award could equally be determined once the game is played or even during the playing of the game.

Figure 8:
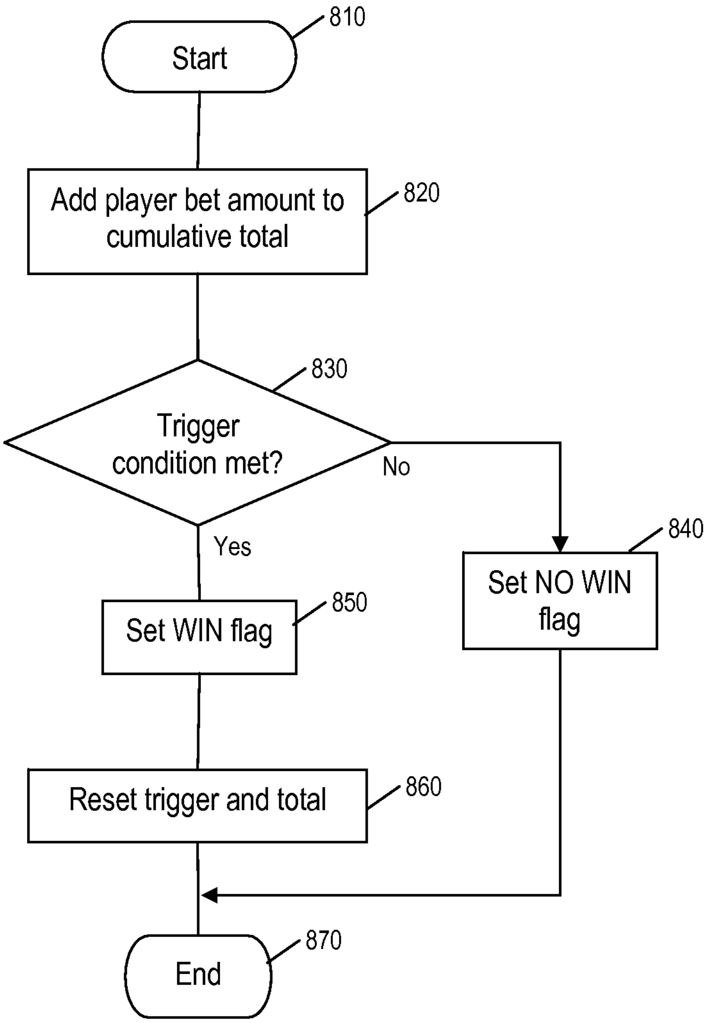
FIG. 8 is an example of a method for determining whether to award a mystery prize.

An example of the determining of a mystery prize based on a trigger condition is illustrated in FIG. 8. At the start 810 the mystery prize determining procedure the amount bet by the player is read and added to the cumulative bet total 820. The cumulative bet total value is then compared to the trigger condition 830, for example the trigger value for a selected mystery prize as described above. If the trigger condition 830 is met then a WIN flag for the mystery prize for the player is set 850 and the trigger condition and cumulative total updated or reset 860 as appropriate and the procedure ends 870. If the trigger condition 830 is not met then a NO WIN flag is set 840 and the procedure ends 870. The mystery prize can them be awarded based on the status of the WIN or NO WIN flags.

Figure 9:
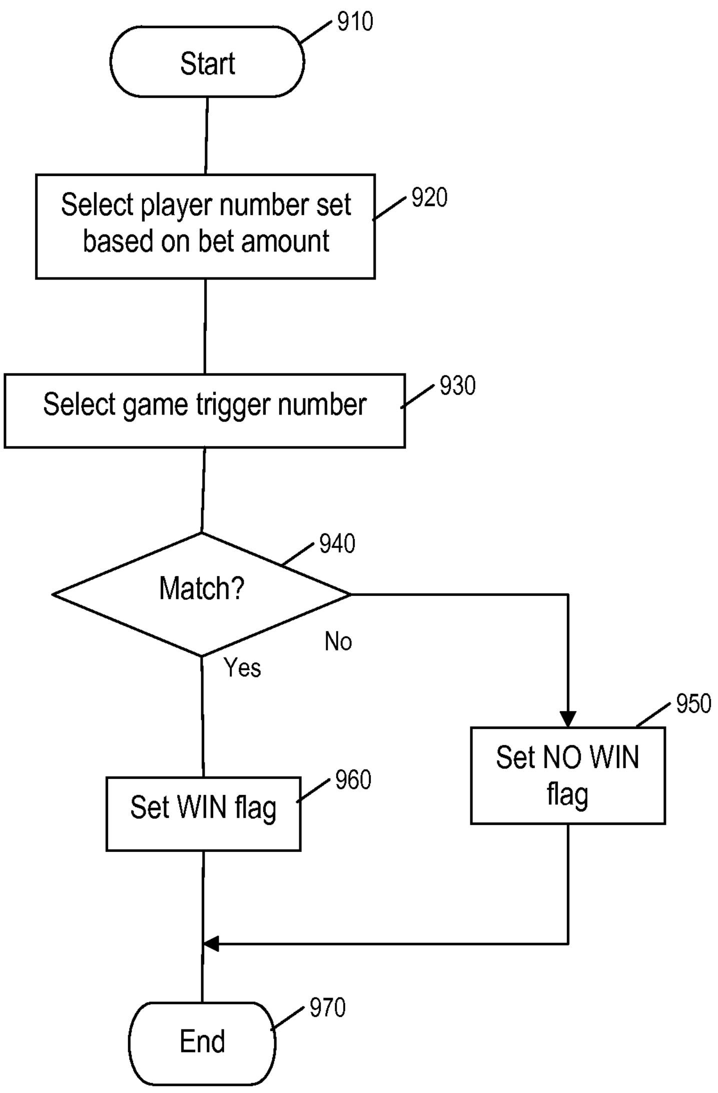
FIG. 9 is an example of an alternative method for determining whether to award a mystery prize.

An example of the determining of a mystery prize where the amount bet is proportional to the chance of wining the mystery prize is illustrated in FIG. 9. At the start 910 the mystery prize determining procedure the amount bet by the player is read. A set of items such as random numbers or symbols is allocated to the player and the size (number of items) of the set is based on the amount bet 920. A trigger item is then randomly selected for the game 930 and compared 940 with the player set. If the trigger item matches one of the items in the player set a WIN flag is set 960. If there is no match a NO WIN flag is set 950. The procedure then ends 970 and the mystery prize is awarded based on the flag status.

EXAMPLES

Example 1

A player is playing a spinning reel game with a maximum of twenty lines and a maximum bet of five credits per line for a game. The maximum bet for a game is one hundred credits. The game also enables feature game play to enable additional outcomes for which additional prizes can be awarded. The feature game play is triggered by a feature symbol occurring an a base game outcome, and feature symbols will be added to the game on payment of an ante bet which costs five times the credit bet for a game.

In the case of the maximum lines are bet for the game and the player also pays the ante-bet, the total cost is one hundred credits for the game and five hundred credits for the ante bet, making a total of six hundred credits.

In this example there is a probability of one in ten of triggering feature game play from a game outcome including the feature symbols where the ante bet has been paid. The probability of winning a fixed prize of ten thousand credits from a feature game outcome is one in five.

Thus, where a player has paid an ante bet, the player has bet five hundred credits for a one in fifty chance of winning ten thousand credits.

The return to player for the fixed prize can be determined from the Equation below $$RTP = \frac{V}{\text{Bet}} \times P_f \times P_{win} \quad [2]$$

Where RTP is the return to player for the fixed prize, V is the value of the fixed prize, Bet is the amount of the ante bet, $P_f$ is the probability of a feature game being played and $P_{win}$ is the probability of winning the fixed prize in the feature game.

Substituting the values for the given example into Equation 2:

$$RTP = \frac{10000}{500} \times \frac{1}{10} \times \frac{1}{5} = \frac{10000}{25000} = 40\% \quad [3]$$

The return to player in this case, for the fixed prize is 40%.

For the game where a player has not paid an ante bet a player has bet only one hundred credits but must also be eligible to win the fixed prize. The fixed prize is therefore awarded as a mystery prize for players of the game when a trigger condition is met. The trigger condition in this example is a cumulative bet total reaching a threshold value, where the threshold value T is calculated using Equation 1 based on the fixed prize value V and the return to player RTP for the fixed prize.

$$T = \frac{V}{RTP} = \frac{10000}{40\%} = 25000 \quad [4]$$

Thus, the fixed prize is awarded as a random mystery prize when the cumulative bet total for the regular game reaches twenty five thousand credits. The prize is awarded to the player who's bet makes the cumulative bet total value equal to or greater than the threshold trigger value.

Example 2

A player is playing a spinning reel game with a maximum of twenty lines and a maximum bet of five credits per line for a game and a chance to win feature game play is added by payment of an ante bet which costs five times the credit bet for a game as described above for Example 1. The maximum bet for a game is one hundred credits so the ante bet to add the feature game play costs five hundred credits.

In the case of the maximum lines are bet for the regular game the player also pays the ante-bet, the total cost is one hundred credits for the regular game and five hundred credits for the ante bet, making a total of six hundred credits.

In this example, as in Example 1, there is a probability of one in ten of triggering feature game play where the ante bet has been paid. The probability of winning a fixed prize of ten thousand credits from a feature game outcome is one in five.

Thus, where a player has paid an ante bet, the player has bet five hundred credits for a one in fifty chance of winning the fixed prize of ten thousand credits. This equates to one chance for every ten credits to win the fixed prize from the feature outcome. The return to player for the feature is 40% determined as in Example 1.

For the game without the ante bet a player must still be eligible to win the additional prize. In this example, the amount bet by a player is used to determine the number of chances the player has to win a mystery prize. As the minimum bet is five credits for one line, a chance to win the mystery prize is provided for every five credits bet. Thus the probability of winning the mystery prize is proportional to the amount bet.

A player who buys only one line of a game will be provided with one chance to win the mystery prize. A player who buys all twenty lines of the game, for one hundred credits will be provided with twenty chances to win the mystery prize. Where a player buys all twenty game lines and also pays the ante bet, a total of six hundred, they will be provided with one hundred and twenty chances to win the mystery prize.

Each chance is represented as one number in a set of numbers selected for the player in accordance with game rules. Independent of the player number selection a trigger number is selected for the game. If the trigger number matches one of the numbers in the player set, the mystery prize is awarded to the player.

The probability of the trigger number matching one of the numbers in a player set is based on the proscribed return to player of the mystery prize. For example the probability can be calculated using:

$$P_{mys} = \frac{B_{min} \times RTP}{V} = \frac{5 \times 0.4}{10000} = \frac{1}{5000} \quad [5]$$

Where $P_{mys}$ is the probability of winning a mystery prize for one chance, $B_{min}$ is a minimum bet amount in credits, RTP is the proscribed return to player for the mystery prize and V is the value of the mystery prize. In this example a person has a one in five thousand chance of wining a fixed prize of ten thousand credits for each five credits bet.

Example 3

A player is playing a spinning reel game with a maximum of twenty lines and a maximum bet of five credits per line for a game and payment of an ante bet will cause additional symbols to be added to the reels to enable additional outcomes. The ante bet costs five times the credit bet for a game as described above for Example 1. The maximum bet for a game is one hundred credits so the ante bet to add the feature game play costs five hundred credits.

In the case of the maximum lines are bet for the regular game the player also pays the ante-bet, the total cost is one hundred credits for the regular game and five hundred credits for the ante bet, making a total of six hundred credits.

In this example there is a one in fifty chance of one of the additional outcomes, including the added symbols, occurring for a reel spin. Thus, where a player has paid an ante bet, the player has bet five hundred credits for a one in fifty chance of winning the fixed prize of ten thousand credits. This equates to one chance for every ten credits to win the fixed prize from the game outcome. The return to player for the additional game outcomes is 40% determined as in Example 1.

For the game without the ante bet a player must still be eligible to win the additional prize. In this example, the amount bet by a player is used to determine the number of chances the player has to win a mystery prize. As the minimum bet is five credits for one line, a chance to win the mystery prize is provided for every five credits bet. Thus the probability of winning the mystery prize is proportional to the amount bet.

A player who buys only one line of a game will be provided with one chance to win the mystery prize. A player who buys all twenty lines of the game, for one hundred credits will be provided with twenty chances to win the mystery prize. Where a player buys all twenty game lines and also pays the ante bet, a total of six hundred, they will be provided with one hundred and twenty chances to win the mystery prize.

Each chance is represented as one number in a set of numbers selected for the player in accordance with game rules. Independent of the player number selection a trigger number is selected for the game. If the trigger number matches one of the numbers in the player set, the mystery prize is awarded to the player.

The probability of the trigger number matching one of the numbers in a player set is based on the proscribed return to player of the mystery prize. For example the probability can be calculated using:

$$P_{mys} = \frac{B_{min} \times RTP}{V} = \frac{5 \times 0.4}{10000} = \frac{1}{5000} \quad [5]$$

Where $P_{mys}$ is the probability of winning a mystery prize for one chance, $B_{min}$ is a minimum bet amount in credits, RTP is the proscribed return to player for the mystery prize and V is the value of the mystery prize. In this example a person has a one in five thousand chance of wining a fixed prize of ten thousand credits for each five credits bet.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of playing a game on a gaming machine having a game controller, a non-transitory memory having data indicative of a plurality of symbols, a wager input, and a display, the method comprising:

determining via the game controller if a first wager has been placed at the wager input for said game;

displaying on the display via the game controller and the non-transitory memory at least one first game outcome having a plurality of first symbols of the plurality of symbols:

determining via the game controller whether to award a first prize based on the at least one first game outcome;

determining via the game controller if a second wager in addition to the first wager has been placed at the wager input; and (i) in response to receipt of both the first wager and the second wager, displaying on the display via the game controller and the non-transitory memory a second game outcome having at least one symbol of the plurality of symbols, said at least one symbol being separate from said first symbols and determining via the game controller whether to award a second prize based on said second game outcome; and (ii) in response to receipt of the first wager and not the second wager, determining via the game controller independently of the first game outcome and the second game outcome, whether to award said second prize including determining a number of chances to award said second prize based on the amount of the first wager.

2. A method as claimed in claim 1, and further comprising determining via the game controller whether the second wager meets a trigger condition for the second prize.

3. A method as claimed in claim 1, and wherein the second wager is proportional to a chance of the player being randomly awarded the second prize.

4. A method as claimed in claim 2, and wherein the trigger condition is based on a proscribed return to player (RTP) for the second prize.

5. A method as claimed in claim 2, and wherein the second game outcome is an outcome of a feature game for which the second prize can be awarded.

6. A method as claimed in claim 5, and further comprising determining the trigger condition based on the probability of the prize being awarded for the feature game and a cumulative bet amount.

7. A method as claimed in claim 6, and wherein the trigger condition is a cumulative bet amount reaching a threshold value.

8. A method as claimed in claim 7, and further comprising determining via the game controller the threshold value using the equation:

$$T = \frac{V}{RTP}$$

where T is the threshold value, V is the prize value and RTP is the return to player for the prize and RTP is based on the probability of the second prize being awarded for a feature game.

9. A method as claimed in claim 3, and wherein for each game, the method further includes:

selecting via the game controller a set of random numbers for a player, wherein the size of the set is based on the second wager;

selecting via the game controller a random trigger number for the game; and if the trigger number matches a number in the player's set of numbers, awarding the second prize to the player.

10. A method as claimed in claim 9, and further comprising selecting via the game controller the trigger number based on the proscribed RTP for a mystery prize automatically and independently of the player number set selection.

11. A method as claimed in claim 1, and wherein at least one second prize is a progressive prize.

12. A method as claimed in claim 1, and wherein at least one second prize is a fixed prize.

13. A method as claimed in claim 12, and wherein the fixed prize is one of a predetermined credit amount, a predetermined cash amount, goods or services.

14. A game controller configured to control play of a game on a gaming machine, having a non-transitory memory having data indicative of a plurality of symbols, a wager input, and a display, on which a player can place a first wager, the game controller comprising:

a game play controller configured to a) in response to receipt of the first wager at the wager input, generate via the non-transitory memory at least one first game outcome having a plurality of first symbols of the plurality of symbols for display on the display, and determine whether to award a first prize based on the at least one first game outcome, and b) in response to receipt of the first wager and a second wager at the wager input, generate via the non-transitory memory a second game outcome having at least one symbol of the plurality of symbols for display on the display, said at least one symbol being separate from said first symbols and being associated with a second prize; and a prize manager configured to:

a) award prizes for the game based on the second game outcome; and b) in response to the player placing the first wager and not the second wager, determine independently of at least the first game outcome and the at least one additional outcome, whether to award said second prize to the player including determining a number of chances to award said second prize based on the amount of the first wager.

15. A game controller as claimed in claim 14, and wherein the prize manager determines whether the additional bet meets a trigger condition for the second prize.

16. A game controller as claimed in claim 14, and wherein the additional bet is proportional to a chance of the player being randomly awarded the second prize.

17. A game controller as claimed in claim 15, and wherein the trigger condition is based on a proscribed return to player (RTP) for the second prize.

18. A game controller as claimed in claim 17, and wherein the second game outcome is an outcome of a feature game for which the second prize can be awarded.

19. A game controller as claimed in claim 18, and wherein the trigger condition is determined based on the probability of the prize being awarded for a feature game and a cumulative bet amount.

20. A game controller as claimed in claim 19, and wherein the trigger condition is a cumulative bet amount reaching a threshold value.

21. A game controller as claimed in claim 20, and wherein the threshold value is determined using the equation:

$$T = \frac{V}{RTP}$$

where T is the threshold value, V is the prize value and RTP is the return to player for the prize and RTP is based on the probability of the second prize being awarded for a feature game.

22. A game controller as claimed in claim 15, and wherein for each game, a set of random numbers is selected for a player, wherein the size of the set is based on the additional bet, a random trigger number is selected for the game, and if the trigger number matches a number in the player's set of numbers, the second prize is awarded to the player.

23. A game controller as claimed in claim 22, and wherein the trigger number is selected based on the proscribed RTP for a mystery prize automatically and independently of the player number set selection.

24. A game controller as claimed in claim 14, and wherein at least one second prize is a progressive prize.

25. A game controller as claimed in claim 14, and wherein at least one second prize is a fixed prize.

26. A game controller as claimed in claim 25, and wherein the fixed prize is one of a predetermined credit amount, a predetermined cash amount, goods or services.

27. A gaming system operable to play a game on a gaming machine, the gaming system comprising:

- a non-transitory memory having data indicative of a plurality of symbols;
- a display;
- a player interface configured to enable a player to enter instructions including bet instructions to place a base bet and an optional additional bet that is in addition to the base bet;
- a game controller configured to
  - a) in response to receipt of the base bet, generate via the non-transitory memory at least one first game outcome having a plurality of first symbols of the plurality of symbols for display on the display, and determine whether to award a first prize based on the at least one first game outcome,
  - b) in response to the base bet and the optional additional bet being placed by the player, generate via the non-transitory memory a second game outcome having at least one symbol of the plurality of symbols to be displayed on the display, said at least one symbol being separate from said first symbols and determine whether to award a second prize based on the at least one second game outcome; and
- a prize manager configured to:
  - a) award prizes for the game based on the second game outcome; and
  - b) in response to the player placing the base bet and not the optional additional bet, determine independently of the first game outcome and the second game outcome, whether to award said second prize to the player including determining a number of chances to award said second prize based on the amount of the base bet.

28. A gaming system as claimed in claim 27, and wherein it is determined whether the optional additional bet meets a trigger condition for the second prize.

29. A gaming system as claimed in claim 27, and wherein the optional additional bet is proportional to a chance of the player being randomly awarded the second prize.

30. A gaming system as claimed in claim 29, and wherein the trigger condition is based on a proscribed return to player (RTP) for the one or more additional prizes.

31. A gaming system as claimed in claim 30, and wherein the second game outcome is an outcome of a feature game for which the second prize can be awarded.

32. A gaming system as claimed in claim 31, and wherein the trigger condition is determined based on the probability of the prize being awarded for a feature game and a cumulative bet amount.

33. A gaming system as claimed in claim 32, and wherein the trigger condition is a cumulative bet amount reaching a threshold value.

34. A gaming system as claimed in claim 33, and wherein the threshold value is determined using the equation:

$$T = \frac{V}{RTP}$$

where T is the threshold value, V is the prize value and RTP is the return to player for the prize and RTP is based on the probability of the prize being awarded for a feature game.

35. A gaming system as claimed in claim 28, and wherein for each game, a set of random numbers is selected for a player, wherein the size of the set is based on the optional additional bet, a random trigger number is selected for the game, and if the trigger number matches a number in the player's set of numbers, the second prize is awarded to the player.

36. A gaming system as claimed in claim 35, and wherein the trigger number is selected based on the proscribed RTP for a mystery prize automatically and independently of the player number set selection.

37. A gaming system as claimed in claim 27, and wherein at least one second prize is a progressive prize.

38. A gaming system as claimed in claim 27, and wherein at least one second prize is a fixed prize.

39. A gaming system as claimed in claim 38, and wherein the fixed prize is one of a predetermined credit amount, a predetermined cash amount, goods or services.

40. A gaming system as claimed in claim 27, and wherein the gaming system is implemented as a stand alone gaming machine.

41. A gaming system as claimed in claim 27, and wherein the gaming system is implemented across a network.

42. A gaming machine comprising:

a credit input mechanism configured to receive a physical item associated with a monetary value for establishing a credit balance, the credit balance being increasable and decreasable;

a memory having data indicative of a plurality of symbols;

a wager input on which a player can place a first wager and a second wager;

a display; and a game controller configured to a) in response to receipt of the first wager at the wager input, generate via the memory at least one first game outcome having a plurality of first symbols of the plurality of symbols for display on the display, and determine whether to award a first prize based on the at least one first game outcome, b) in response to receipt of the first wager and the second wager at the wager input, generate via the non-transitory memory a second game outcome having at least one symbol of the plurality of symbols for display on the display, the at least one symbol being separate from said first symbols and being associated with a second prize, and c) in response to the player placing the first wager and not the second wager, determine independently of at least the first game outcome and the at least one additional outcome, whether to award the second prize to the player including determining a number of chances to award the second prize based on the amount of the first wager; and an output mechanism configured to cause a payout associated with the credit balance.

* * * * *